United States Patent [19]

Farkas et al.

[11] Patent Number: 5,639,819
[45] Date of Patent: Jun. 17, 1997

[54] POLYAMIDE COMPOSITIONS

[75] Inventors: Nicholas Farkas, Kingston, Canada; David Neil Marks; Stuart Marshall Nemser, both of Wilmington, Del.

[73] Assignees: E. I. Du Pont de Nemours and Company, Wilmington, Del.; Du Pont Canada Inc., Mississauga, Canada

[21] Appl. No.: 84,246

[22] PCT Filed: Jan. 8, 1992

[86] PCT No.: PCT/CA92/00011

§ 371 Date: Jul. 9, 1993

§ 102(e) Date: Jul. 9, 1993

[87] PCT Pub. No.: WO92/12194

PCT Pub. Date: Jul. 23, 1992

[51] Int. Cl.$^6$ ............. C08J 5/10; C08K 11/00; C08L 77/00; C08L 79/00

[52] U.S. Cl. ............. 524/606; 525/423; 528/335; 528/340

[58] Field of Search ............. 524/606, 425, 524/430, 437, 439, 441, 445, 447, 448, 449, 451, 494, 495; 525/423; 528/335, 340

[56] References Cited

U.S. PATENT DOCUMENTS 4,062,828  12/1977  Herwig et al. ............. 260/45.7 P
4,845,168  7/1989  Dykes et al. ............. 525/423
5,185,428  2/1993  Hammond, Jr. et al. ............. 528/340
5,194,578  3/1993  Anton ............. 528/349

FOREIGN PATENT DOCUMENTS 0295906  12/1988  European Pat. Off. .
46-41391  12/1971  Japan .
WO91/19753  12/1991  WIPO .

*Primary Examiner*—Paul R. Michl
*Assistant Examiner*—U. K. Rajguru

[57] ABSTRACT

A mouldable reinforced polyamide composition comprising;

(a) a polyamide consisting essentially of between about 0.5 and about 99.5 mol. % of aliphatic diamines having 4–12 carbon atoms and a complementary amount of 2-methyl-pentamethylene diamine copolymerized with aliphatic dicarboxylic acids having 6–12 carbon atoms; and (b) a filler in an amount of 0.5 to 200 parts by weight per 100 parts by weight of said polyamide. The polyamide has an RV greater than about 20. Related polyamides, especially in which the acid is 1,12-dodecanedioic acid, are also disclosed. The polyamides may be used in a wide variety of end-uses, including moulding, and exhibit excellent gloss compared with nylon 6,6.

11 Claims, No Drawings

POLYAMIDE COMPOSITIONS

This application is a 371 of /CA92/00011, Jan. 8, 1992.

The present invention relates to polyamides, and especially to mouldable reinforced polyamide compositions which have excellent heat resistance characteristics, mechanical and physical properties and moulding characteristics. The polyamides are formed, in part, from 2-methyl-pentamethylene diamine units.

A wide variety of polymers e.g. polyethylene and polypropylene, may be used in moulding processes, including compression moulding, injection moulding and extrusion moulding, to give high quality products. However, such polymers may lack the physical or other characteristics required in many applications. Other polymers, frequently referred to as engineering polymers, have improved characteristics that are useful for more demanding end-uses. Such polymers include polyesters and polyamides that have been modified e.g. by the addition of toughening agents or, in particular, the addition of reinforcing agents. For example, heat-resistance characteristics, mechanical properties and/or physical and chemical properties may be improved by incorporating fillers such as glass powder, graphite powder, glass fibres and carbon fibres or minerals of various types into the polymers.

Among the more important polymers used in moulding applications is polyhexamethylene adipamide, also known as nylon 6,6. This polymer has acceptable properties for many end-uses. When filled with toughening agents, glass fibres and/or mineral fillers, nylon 6,6 may also be used in certain engineering applications. Another polymer widely used in moulding applications, including in some engineering end-uses, is polycaprolactam, also known as nylon 6. While both nylon 6,6 and nylon 6 have repeating units of similar length, moulded products made from these two polymers tend to exhibit different characteristics.

In particular, compositions based on nylon 6 tend to exhibit superior gloss when moulded compared with corresponding compositions based on nylon 6,6.

It has now been found that polymer compositions based on a polyamide having 2-methyl-pentamethylene diamine as a comonomer, when filled with e.g. glass fibres and/or minerals, have useful moulding characteristics, including a variety of improved physical characteristics. Related polyamides have also been found.

Accordingly, the present invention provides a mouldable reinforced polyamide composition comprising:

(a) a polyamide consisting essentially of between about 0 and about 99.5 mole percent of at least one aliphatic diamine having 4–12 carbon atoms and a complementary amount of 2-methyl-pentamethylene diamine polymerized with at least one aliphatic dicarboxylic acid having 6–12 carbon atoms, the polyamide having a relative viscosity greater than about 20; and (b) a filler in an amount of 0.5 to 200 parts by weight per 100 parts by weight of said polyamide.

In preferred embodiments of the compositions of the invention, the aliphatic dicarboxylic acid is adipic acid or 1,12-dodecanedioic acid.

The present invention also provides a polyamide consisting essentially of between about 0 and about 99.5 mole percent of at least one aliphatic diamine having 4–12 carbon atoms and a complementary amount of 2-methyl-pentamethylene diamine polymerized with at least one aliphatic dicarboxylic acid having 6–12 carbon atoms, the polyamide having an RV greater than about 20; with the proviso that the polyamide is not a copolyamide consisting essentially of between about 60 and about 99.5 mole percent hexamethylene adipamide units and between about 0.5 and 40 mole percent 2-methyl-pentamethylene adipamide units with an RV greater than about 25 and a melting point of greater than about 220° C.

The present invention further provides a polyamide consisting essentially of between about 0 and about 99.5 mole percent of at least one aliphatic diamine having 4–12 carbon atoms and a complementary amount of 2-methyl-pentamethylene diamine polymerized with 1,12-dodecanedioic acid, the polyamide having an RV greater than about 20 and a solubility in methanol at 65° C. of less than 5% by weight.

Additionally, the present invention provides an article formed from a polyamide consisting essentially of between about 0 and about 99.5 mole percent of at least one aliphatic diamine having 4–12 carbon atoms and a complementary amount of 2-methyl-pentamethylene diamine polymerized with at least one aliphatic dicarboxylic acid having 6–12 carbon atoms, the polyamide having an RV greater than about 20, said article being a film, wire coating, pipe, tubing, thermoformed article, rotomoulded article, molded article or powder coating.

The polyamides of the composition of the invention are substantially linear polyamides which consist essentially of between about 0 and about 99.5 mole percent of at least one aliphatic diamine having 4–12 carbon atoms and a complementary amount of 2-methyl-pentamethylene diamine, polymerized with at least one aliphatic dicarboxylic acid having 6–12 carbon atoms; both the diamines and the dicarboxylic acids may be branched but are preferably unbranched. Examples of the diamines include 1,4 tetramethylene diamine, 1,6 hexamethylene diamine, 1,8 octamethylene diamine, 1,10 decamethylene diamine and 1,12 dodecamethylene diamine. Examples of the dicarboxylic acids are 1,6-hexanedioic acid (adipic acid), 1,7-heptanedioic acid (pimelic acid), 1,8-octanedioic acid (suberic acid), 1,9-nonanedioic acid (azelaic acid), 1,10decanedioic acid (sebacic acid) and 1,12-dodecanedioic acid.

In embodiments, the polyamide does not contain aliphatic diamine i.e. there is 0% aliphatic diamine, which means that if only one aliphatic carboxylic acid is used, the polyamide is a homopolymer. A preferred unfilled homopolymer is the homopolymer of 2-methyl-pentamethylene diamine and 1,12-dodecanedioic acid. Alternatively, the polyamide does contain aliphatic diamine, usually one type of aliphatic diamine but mixtures may be used. Preferably, at least 0.5% of aliphatic diamine, and especially 0.5–40% of aliphatic diamine, is used. In other preferred embodiments, the polyamide consists essentially of between about 60 and about 99.5 mole percent hexamethylene adipamide units and between about 0.5 and 40 mole percent 2-methyl-pentamethylene adipamide (Me5-6) units.

In the preferred polyamides of the composition, the Me5-6 units are generally randomly distributed throughout the copolymer. However, it is to be understood that the polyamide may also be in the form of block copolymers e.g. as formed by blending a polyamide containing Me5-6 with another polyamide that may or may not contain Me5-6, and melting or extrusion of the blend. In an embodiment, the polyamide used in the forming of articles has been formed by melt blending a (i) polyamide consisting essentially of between about 0 and about 99.5 mole percent of at least one aliphatic diamine having 4–12 carbon atoms and a complementary amount of 2-methyl-pentamethylene diamine polymerized with at least one aliphatic dicarboxylic acid having 6–12 carbon atoms, with (ii) a polyamide formed from aliphatic diamine having 4–12 carbon atoms and aliphatic dicarboxylic acid having 6–12 carbon atoms.

For convenience, the polyamide of the composition will be particularly discussed with reference to the polyamide formed from hexamethylene diamine and adipic acid, which may be referred to as nylon 6,6/Me5-6.

Depending on the intended end-use of the compositions of the invention, it may be advantageous to employ different molar percentages of Me5-6 in the polyamide. The effects of varying the percentages of Me5-6 are illustrated in the examples hereinafter.

The polyamide of the compositions of the invention have a formic acid relative viscosity (RV) greater than about 20, and preferably in the range of about 25 to about 250. The preferred RV of the polyamide will depend to a substantial extent on the intended end-use of the polyamide. For instance, if the polyamide is intended for powder coating end-uses, then the preferred RV will likely be in the range of about 20 to about 30. For injection moulding, wire coating and film extrusion end-uses, the preferred RV will likely be in the range of about 30 to about 80. For extrusion of pipe or tubing or film, especially blown film, and for blow moulding processes, the preferred RV will likely be in the range of about 80 to about 250. The polyamides used to form compositions should be selected with reference to the intended end use, so as to provide articles with desirable properties.

The melting points of the polyamides vary with the percentage of Me5-6 and thus range up to close to the melting point of nylon 6,6 i.e. about 265° C., when the percentage of Me5-6 is about 0.5%. With increasing amounts of Me5-6, the melting point decreases to about 220° C. when the Me5-6 percentage is about 40%. In preferred embodiments, the melting point is at least 220° C. In the embodiments in which the aliphatic diamine is other than hexamethylene diamine and/or the aliphatic dicarboxylic acid is other than adipic acid, lower melting points may be obtained, especially melting points below 220° C. Such lower melting points may be advantageous in some end uses.

The polyamides of the composition can be prepared by condensation polymerization in an aqueous "salt" solution. As an example, the salt solution may be formed by mixing adipic acid with hexamethylene diamine and 2-methyl-pentamethylene diamine in the molar proportions necessary to produce the polyamide with the desired amount of Me5-6 units. Procedures useful for the production of homopolymer i.e. poly(hexamethylene adipamide) may be applied to the production of the polyamide used in the compositions of the invention. It is generally necessary, however, to modify such procedures to make sure that the 2-methyl-pentamethylene diamine, which is more volatile, stays in solution sufficiently long to react. 2-methyl-pentamethylene diamine is commercially available and is sold by E. I. du Pont de Nemours and Company, of Wilmington, Del. U.S.A. under the trademark DYTEK® A.

A particularly convenient method for making a polyamide for the composition is to provide aqueous salt solutions of hexamethylene diammonium adipate i.e. 1,6-diaminohexane adipate, and 2-methyl-pentamethylene diammonium adipate. The two solutions are admixed in the proportions required to produce a salt solution for the desired polyamide. It may be advantageous to employ salt solutions in which the pH of the solution is about 1 pH unit above the neutralization pH to assist in keeping the 2-methyl-pentamethylene diamine (Me5-6) in solution. Catalysts known for use in the manufacture of the homopolymer i.e. nylon 6,6, may be added to the salt solution e.g. phenyl phosphinic acid, manganese hypophosphite may be added. The salt solution with catalyst is reacted in a suitable reaction vessel e.g. an autoclave, under an inert atmosphere. The polyamide may also be made in a variety of continuous polymerization processes, solid state polymerization processes and melt extrusion polymerization processes, or combinations of any of the aforementioned processes.

A variety of fillers may be added to the compositions of the invention e.g. in the form of powders, platelets, fibres, spheres, microspheres or in acicular form. More specifically, powdery, platen, spherical and/or acicular inorganic compositions such as silica, alumina, silicate-alumina, talc, metasilicates, carbonates, dolomite, diatomaceous earth, clay, kaolin, quartz, glass, mica, graphite, titanium dioxide, carbon black, molybdenum disulphide, gypsum, red iron oxide, zinc oxide, aluminum, copper and stainless steel, fibrous inorganic compounds such as glass fibre, carbon fibre, boron fibre, ceramic fibre, asbestos fibre and stainless steel fibre, and conductive fillers e.g. nickel, may be added. Mixtures of two or more fillers may be used. In addition, fillers treated with a silane coupling agent or other coupling agent may be used.

The amount of filler is 0.5 to 200 parts by weight, per 100 parts by weight of the polyamide. In preferred embodiments the amount of filler is 2 to 100 parts by weight of filler, per 100 parts by weight of the polyamide.

In embodiments of the invention, articles formed from the filled polyamides have a gloss (60°), as measured by the procedure of ASTM D-523, of at least 60 and especially at least 70.

Articles may be formed from the polyamides in the absence of filler. Such articles include powder coatings, thermoformed articles, wire and coil coatings, film, moulded products, pipe and tubing. In embodiments, the film is oriented or unoriented film having a thickness of 12–130 µm, and may be laminated to other films e.g. polyolefin films.

Stabilizers, plasticizers, release agents, toughening agents, flame retardants, smoke depressants, lubricants, cross-linking agents and other additives known for use in polyamide compositions may be added to the compositions of the invention. Many stabilizers or antioxidants are combinations of copper-containing compounds with alkali metal halides, examples of which include copper (I) halides e.g. copper iodide and copper bromide, and lithium, sodium and potassium bromides and iodides. Other stabilizers or costabilizers include phosphorus-containing antioxidants e.g. triaryl- or tris(alkylaryl)-phosphines, organic and inorganic phosphites, thioesters, organo mono- or di-sulphides. UV or other stabilizers include phenolic antioxidants, (cyclo) aliphatic sterically hindered amines and aromatic mono-, di- or polyamines. Metal deactivators may also be added. Typical amounts are about 0.01 to about 2.5% by weight, preferably 0.1 to 2.0% by weight.

Toughening agents, or impact modifiers, include copolymers formed from ethylene and/or propylene, and diene rubbers, all of which may or may not be grafted with e.g. acidic functionality. Toughening agents are generally used in amounts of 1 to 45% by weight, especially 4 to 35% by weight.

Examples of flame retardants and smoke depressants include halogenated aromatic compounds, polyhydrated inorganic compounds e.g. alumina trihydrate, magnesium or calcium hydroxides, antimony compounds, barium sulphate, phosphorus-containing compounds, borates, and melamine derivatives. Some combinations of such additives are known to act in a synergistic manner. Flame retardants and smoke depressants typically are used in amounts of about 1 to 50% by weight, preferably 2 to 45% by weight. Other additives include silicon rubbers and oils, slip agents, antistatic compounds, chemical blowing agents, pigments, dyes and nucleating agents, which may be used in amounts of about 0.01 to 5% by weight, especially 0.1 to 3% by weight.

The lower melting points of the polyamides, compared with nylon 6,6, may permit use of temperature-sensitive additives that cannot normally be used with nylon 6,6 (polyhexamethylene adipamide). Examples may include certain pigments, flame retardants and smoke depressants. In addition, the lower melting points will permit the use of lower processing temperatures, which should lead to lower degradation of the polymer during processing. In addition, the polyamides tend to exhibit a smaller degree of mould shrinkage in moulding processes than nylon 6,6.

The compositions may be prepared by blending the polyamide and filler and then melt compounding the blend to form the composition. Such melt compounding may be carried out in single screw extruders equipped with suitable mixing screws, but is more preferably carried out in twin screw extruders.

The polyamides may be cross-linked by extrusion with a diepoxide cross-linking agent i.e. an epoxide having at least two terminal epoxy groups, in the presence of a catalyst, to provide the polyamide with the characteristics of a polyamide of higher molecular weight. In particular, the polyamide may be admixed with 0.01 to 5%, by weight, of an epoxide having at least two terminal epoxy groups and a molecular weight of less than 1000, preferably selected from the group consisting of polyglycol diepoxides, bisphenol-A diepoxides, glycidated novolac epoxides, cycloaliphatic epoxides, triglycidyl ethers, tetraglycidyl ethers, diglycidyl ether of resorcinol, diglycidyl ester and bisphenol-F diepoxides; and 0.005 to 1%, by weight, of a catalyst selected from the group consisting of (a) a catalyst of the type used in the polymerization of polyamides and (b) a compound that is a ring opener for the epoxy groups of the epoxide e.g. sodium hypophosphite, manganese hypophosphite, orthophosphoric acid, sodium phenyl phosphinate, phosphine/ boron trifluoride complex, potassium phosphate and potassium hydroxide, and mixtures thereof. Methods for the cross-linking of polyamides using diepoxides are disclosed in U.S. Pat. No. 4,845,168 of Dykes and Kuhnemann. The polyamide to be cross-linked may contain fillers, reinforcing agents, toughening agents and other additives to modify or improve the properties of the polyamide, examples of which have been described above.

The compositions of the invention may be used in a variety of end-uses, especially end-uses that require engineering polymers. In particular, the compositions may be injection moulded or compression moulded to produce moulded articles having superior gloss to articles moulded from nylon 6,6. Compositions may also be used as powder coatings, or extruded into pipe, tubing, cast film, coated onto wires or rotomoulded. In addition, compositions may be blow moulded or blown into film.

The present invention is illustrated by the following examples:

EXAMPLE I

Compositions containing 33% glass were compounded using nylon 6,6, nylon 6 and the two polyamides as described herein viz. polyamides formed from hexamethylene adipamide and 2-methyl-pentamethylene adipamide (Me5-6) in ratios of 95/5 and 65/35. The nylon 6,6 was a polyamide resin sold under the trade mark Zytel and having an RV of 42 (Zytel® 42DB) and the nylon 6 was Firestone® C-200-001 polyamide resin.

In each instance, the polymer was fed into a twin screw extruder, and the glass fibres (3.2 mm in length) were metered separately at a fixed glass/polymer ratio into the extruder at a subsequent feed port. The glass fibres were melt blended with the polymer in the extruder, extruded through the extruder die and into a quenching bath. The cooled strand obtained was then cut into flakes by a pelletizer, and then was bagged in moisture proof bags for subsequent moulding. The glass content of all compositions was 33±2% by weight.

The compositions thus obtained were subsequently injection moulded into test specimens. During the injection moulding process, the mould temperatures were kept at 43° C.

The procedures used in the tests were as follows:

| Tensile Strength | ASTM D-638 |
| Flexural Modulus | ASTM D-790 |
| Notched Izod Impact Strength | ASTM D-256 |
| Gloss Measurement | ASTM D-523 |

Elongation was measured on an Instron® apparatus (procedure of ASTM D-638) except that elongation was measured on the crosshead movement of the jaw gripping the sample.

The results obtained are given in Table I.

TABLE I

| Run No. | 1 | 2 | 3 | 4 |
| --- | --- | --- | --- | --- |
| RV | 82 | 31 | 39 | 42 |
| Me5-6 Content | 0 | 35 | 5 | 0 |
| Tensile Strength (N/mm$^2$) | 150 | 175 | 190 | 190 |
| Elongation (%) | 7.1 | 8.1 | 9.1 | 9.3 |
| Notched Izod Impact Strength (J/m) | 96 | 80 | 96 | 85 |
| Flexural Modulus (N/mm$^2$) | 8780 | 9300 | 9150 | 9200 |
| Gloss (60 degrees) | 63 | 68 | 69 | 36 |
| Mould Shrinkage (%) | | | | |
| Flow direction | 0.2 | 0.2 | 0.3 | 0.4 |
| Transverse direction | 0.8 | 0.8 | 1.1 | 1.2 |

Note:
(a) Runs 1 and 4 were conducted with nylon 6 and nylon 6,6, respectively, and are comparative runs.
(b) All properties were measured on samples moulded at 66° C.; for gloss measurements, samples were moulded at 43° C., except for Run 2 where the samples were moulded at 66° C.

This example shows that, notwithstanding the lower relative viscosity of the polymers, the compositions of Runs 2–3 showed higher tensile and modulus properties than the composition of Run 1. It could be noticed that the gloss values increased significantly with presence of the Me5-6 comonomer, even at 5% level, as compared to those given by the nylon 6,6 resin (Run 4). For polymers of similar RV, mould shrinkage was also lower with the copolymers.

EXAMPLE II

Compositions of nylon 6,6, nylon 6, and compositions of hexamethylene adipamide and Me5-6 polyamides with ratios of 95/5 and 80/20 were compounded with 38% silanated metasilicate mineral filler (wollastonite) and 1.25% titanium dioxide. The polymers were preblended with titanium oxide concentrate in a V-shape mechanical blender. The blend obtained was fed to an extruder at the feed port, and the metasilicate (containing a silane coupling agent) was metered separately into the extruder through a subsequent port. The melted composition was extruded through a die and into a quenching bath. The cooled strand obtained was cut into flakes by a pelletizer, and then was bagged in moisture proof bags.

The compositions obtained were injection moulded into test specimens, which were tested using the procedures of Example I. During the injection moulding process, the mould temperatures were kept at 66° C. in all instances, except for gloss measurements where the samples were moulded at 43° C.

The results obtained are given in Table II.

TABLE II

| Run No. | 5 | 6 | 7 | 8 |
|---|---|---|---|---|
| RV | 82 | 31 | 39 | 42 |
| Me5-6 Content | 0 | 20 | 5 | 0 |
| Tensile Strength (N/mm$^2$) | 79 | 86 | 87 | 93 |
| Elongation (%) | 7.2 | 5.1 | 5.6 | 5.7 |
| Notched Izod Impact Strength (J/m) | 43 | 21 | 21 | 27 |
| Flexural Modulus (N/mm$^2$) | 8440 | 9240 | 9240 | 9020 |
| Gloss (60 degrees) | 70 | 63 | 63 | 36 |
| Mould Shrinkage (%) | | | | |
| Flow direction | 0.3 | 0.5 | 0.6 | 0.7 |
| Transverse direction | 0.7 | 1.1 | 1.2 | 1.6 |

Note:
Runs 5 and 8 were conducted on nylon 6 and nylon 6,6, respectively, and are comparative runs.

This example shows that, notwithstanding the lower relative viscosity of the polymers, the compositions of Runs 6–7 showed higher tensile and modulus properties than the composition of Run 5. For polymers of similar RV, mould shrinkage was also lower with the copolymers.

It could be noticed that the gloss values increased significantly with the presence of the Me5-6 comonomer, even at 5% level, as compared to those given by the nylon 6,6 resin (Run 8).

EXAMPLE III

Compositions were prepared from nylon 6,6 and three polyamides as described herein formed from hexamethylene adipamide and Me5-6 in ratios of 95/5, 80/20 and 65/35. The polymers were blended, in a drum blender, with 19% ethylene/propylene/diene rubber, 11% of which had been modified by grafting with acid functionality. The blend was fed into the extruder, melt blended and extruded through a die into a quenching bath. The cooled strands obtained were then cut into flakes by a pelletizer, and bagged in moisture proof bags.

The resulting compositions were injection moulded into test specimens; mould temperatures were 66° C. in all instances. The properties of the specimens were measured using the procedures specified in Example I, except that elongation was measured by the procedure of ASTM D-638.

The results obtained are given in Table III.

TABLE III

| Run No. | 9 | 10 | 11 | 12 |
|---|---|---|---|---|
| RV | 31 | 31 | 39 | 42 |
| Me5-6 Content | 35 | 20 | 5 | 0 |
| Tensile Strength (N/mm$^2$) | 49 | 51 | 49 | 51 |
| Elongation (%) | 35 | 62 | 75 | 77 |
| Notched Izod Impact Strength (J/m) | 570 | 750 | 900 | 1040 |
| Flexural Modulus (N/mm$^2$) | 1800 | 1800 | 1810 | 1810 |
| Gloss (60 degrees) | 71 | 75 | 77 | 33 |

Note: Run 12 is a comparative run (nylon 6,6).

It could be noticed that the gloss values increased significantly with the presence of the Me5-6 comonomer, even at 5% level, as compared to those given by the nylon 6,6 resin. All four compositions were toughened during the compounding steps.

EXAMPLE IV

The effect of bulk blending two compositions, each of which contained 33% glass, was determined. The polymers of the compositions were nylon 6,6 and a polyamide of hexamethylene adipamide and Me5-6 (80/20). The glass filled compositions of the polyamide were prepared as described in Example I. The nylon 6,6 resin was the Zytel® 70G33 resin, which is a glass filled composition containing 33% glass.

The two glass-filled compositions were bulk blended together (50:50). All compositions were injection moulded into the plaques, using temperatures of 260°–270° C. for the copolymer and 280°–290° C. for nylon 6,6 and the blend. Mould temperatures of 43° C. were used in all instances.

The results demonstrated that by simple bulk blending the nylon 6,6 compounded reinforced composition with some similarly reinforced compounded Me5-6 polyamide composition, the surface appearance of the subsequent moulded articles was significantly enhanced, as compared with articles formed from nylon 6,6; the gloss of the blend was slightly higher than that for the Me5-6 polyamide and substantially higher than that for nylon 6,6.

EXAMPLE V

Tests were conducted using un-filled polymers. The polymers were nylon 6,6, and the 95/5 and 80/20 hexamethylene adipamide/Me5-6 polyamides. The polymers were dried for 16 hours at 70° C. under vacuum/nitrogen purge before being injection moulded into test specimens. A mould release agent (0.25 wt %) was used. The mould temperature was 66° C. in all instances.

The results are given in Table IV.

TABLE IV

| Run No. | 13 | 14 | 15 |
|---|---|---|---|
| RV | 42 | 39 | 31 |
| Me5-6 Content | 0 | 5 | 20 |
| Melting Pt. (degrees C.) | 260 | 249 | 240 |
| Tensile Strength (N/mm$^2$) | 78 | 78 | 77 |
| Elongation (%) | 84 | 62 | 40 |
| Notched Izod Impact Strength | 26 | 24 | 24 |

TABLE IV-continued

| Run No. | 13 | 14 | 15 |
|---|---|---|---|
| (J/m) | | | |
| Flexural Modulus (N/mm²) | 2750 | 2710 | 2750 |

Note: Run 13 is a comparative run (nylon 6,6)

It could be noticed that the tensile strength, flexural modulus, and the notched Izod impact strength were essentially identical in all compositions, although the polyamides (Runs 14 and 15) had lower melting points. In addition, the tensile strengths of the polyamides were similar to that of nylon 6,6 (Run 13) even though the polymer of the latter had a higher RV (molecular weight).

EXAMPLE VI

Hexamethylene adipamide/Me5-6 (65/35) polyamide was compounded with antioxidants (Irganox® 1098 and Ultranox® 626) and a small amount of titanium oxide, by blending in a mechanical blender and then compounding in a twin-screw extruder, cooling the extrudate and pelletizing. The composition obtained was then ground into 60 mesh powder using a RETSCH® Grinder ZM-1 in the presence of liquid nitrogen.

A fluidized bed containing only the ground composition was then used to coat aluminum plate (dimensions: 50×77×2 mm) with the powder. The aluminum plate was first preheated inside a muffle furnace at 315° C. for 9 minutes, and immediately dipped into the fluidized bed. The fluidized bed was kept at room temperature. The aluminum plate, now coated with the polymer, was then transferred into another muffle furnace (255° C.) for 5.5 minutes. The coated plate was taken out from the furnace and was allowed to cool to room temperature.

A 1.6 mm thick layer of polyamide was coated onto the aluminum plaque with good adhesion. The surface of the polymer coating was even and registered a surface gloss value of 40.

EXAMPLE VII

A composition was prepared using a polyamide containing about 65 mole percent of hexamethylene adipamide units and 35 mole percent 2-methylpentamethylene adipamide units. The polyamide had a melting point of about 225° C. The composition was prepared in a twin screw extruder by feeding the polyamide to the hopper of the extruder, together with 1% by weight of a polyglycol diepoxide (DER 732 from Dow Chemicals) in liquid form and 0.15% by weight of sodium hypophosphite in the form of a concentrate of 10% sodium hypophosphite in a low density ethylene/butene-1 copolymer carrier. 0.25% by weight of heat stabilizing additives were also added to the extruder. The compounded material was extruded and pelletized.

The procedure was repeated, except that 10% by weight of an acid modified ethylene/propylene/diene elastomer and 7.55% by weight of an unmodified ethylene/propylene/diene elastomer were also incorporated into the composition. The composition was extruded and pelletized.

The melt viscosities of the compositions were measured at 240° C. using a Kayness capillary viscometer equipped with a die having an orifice with an L/D of 20. The shear rate/viscosity data obtained is given in Table V.

TABLE V

| Run No. | 16 | 17 | 18 |
|---|---|---|---|
| Composition | A | B | C |
| Cross-linked | No | Yes | Yes |
| Moisture Content (%) | 0.017 | 0.041 | 0.032 |
| Viscosity (Pa · s) | | | |
| Shear Rate (1/s) | | | |
| 10.41 | 149 | 1140 | 2700 |
| 31.25 | 159 | 990 | 1860 |
| 100 | 156 | 705 | 1140 |
| 298 | 143 | 461 | 677 |
| 1000 | 117 | 262 | 357 |

The results show a dramatic increase in melt viscosity compared with that obtained with the polyamide prior to cross-linking. Thus, the polyamides described herein may be cross-linked using diepoxides.

EXAMPLE VIII

Polyamides formed from hexamethylene adipamide units and 2-methylpentamethylene adipamide units were extruded into film having a thickness of 65–100 um, using a 20 mm Welding Engineers twin screw extruder equipped with a 15 cm flat film die. The molten web of polymer from the die was cooled on a chill roll and wound up into film. As a comparison, films were also formed using polyhexamethylene adipamide. In all instances, the polymer melt temperature at the extrusion die was maintained between 280° and 285° C.

Further experimental details and the results obtained are given in Table VI.

TABLE VI

| Run No. | 19 | 20 | 21 | 22 | 23 |
|---|---|---|---|---|---|
| Polymer | A | B | C | A | B |
| Chill Roll Temperature (¾ C.) | 46 | 46 | 46 | 93 | 93 |
| Tensile Strength (N/mm²) | | | | | |
| MD | 53 | 41 | 46 | 47 | 44 |
| TD | 53 | 52 | 47 | 46 | 54 |
| Elongation at Break (%) | | | | | |
| MD | 370 | 250 | 440 | 370 | 340 |
| TD | 300 | 360 | 400 | 220 | 320 |
| Yield Strength (N/mm²) | | | | | |
| MD | 36 | 36 | 30 | 43 | 41 |
| TD | 36 | 34 | 31 | 39 | 39 |
| Tensile Modulus (N/mm²) | | | | | |
| MD | 687 | 547 | 403 | 712 | 634 |
| TD | 705 | 578 | 506 | 924 | 699 |
| Graves Tear (N/mm) | | | | | |
| MD | 211 | 199 | 197 | 237 | 229 |
| TD | 222 | 195 | 188 | 240 | 218 |

Note:
MD = machine direction, TD = transverse direction
Polymer A = Polyhexamethylene adipamide
Polymer B = Nylon 6,6/Me5-6 (80/20)
Polymer C = Nylon 6,6/Me5-6 (60/40)
Tensile strength, elongation at break, yield strength and tensile modulus were measured by the procedure of ASTM D882-83
Graves tear was measured by the procedure of ASTM D1004-66

For the films formed using a chill roll temperature of 46° C., no significant differences (95% confidence interval) were apparent in the properties obtained, except in the tensile modulus which decreased with increasing amounts of 2-methylpentamethylene adipamide. For films formed using a chill roll temperature of 93° C., no significant differences in properties were noted.

The results show that films may be made from the polyamides, and that such films are similar to films formed from polyhexamethylene adipamide but with a tendency to be more flexible. Permeability tests showed that the permeability to oxygen tended to decrease with increasing content of Me5-6.

Thermoforming tests were conducted on film formed from the polyamide of hexamethylene adipamide and 2-methyl pentamethylene adipamide, in which the ratio was 65/35, that had been extruded on a 120 mm wide die using a 53 mm Werner & Pfleiderer twin screw extruder. It was found that the films could be thermoformed, especially at temperatures of between about 60° and 80° C. The thermoformed packages tended to shrink in volume, which could be a useful property in some end-uses.

Additional thermoforming tests were carried out on film formed from a polyamide of hexamethylene adipamide and 2-methyl pentamethylene adipamide in which the ratio was 95/5, and on film made from a blend of polyhexamethylene adipamide (70%) and a polyamide of hexamethylene adipamide and 2-methyl pentamethylene adipamide in which the ratio was 65/35 (30%). On the basis of all the tests conducted, it was concluded that increasing the proportion of 2-methyl pentamethylene adipamide in the polymer improved the ability of the film to be thermoformed in the 60°–80° C. temperature range i.e. there were less failures of the film. Shrinkage of the film after thermoforming increased but impact strength decreased.

Tests on heat sealability have shown that the 70/30 blend described above may be heat sealed at a temperature of less than 200° C., whereas polyhexamethylene adipamide heat seals at about 245° C. Film made from polymers of the invention are more heat sealable than polyhexamethylene adipamide.

EXAMPLE IX

A 12 liter reaction vessel equipped with a helical ribbon agitator and a thermowell to measure reaction temperature, was charged with 1871.1 g (8.135 moles) of dodecanedicarboxylic acid, 1137.8 g (5.689 moles) of dodecamethylene diamine, 284.0 g (2.448 moles) 2-methyl pentamethylene diamine, 8.6 g of acetic acid, 14 ml of 10% (by weight) Carbowax® 3350 polyethylene glycol in water and 2000 g of demineralized water.

With the reactor agitator rotating at 50 rpm, the mixture was heated to 130° C., vented to remove entrained oxygen and when the reaction mixture was heated to 209° C. With the pressure of the reaction mixture being maintained at 1.72 MPa, volatile matter was released over a period of 72 minutes, during which time the temperature of the reaction mixture rose to 225° C. The pressure in the reactor was then reduced to atmospheric pressure over a period of 54 minutes, the temperature in the reaction mixture rising to 271° C. The rate of agitation was then reduced to 5 rpm. The reaction mixture obtained was maintained under a vacuum (40 kPa) for 15 minutes. The polymer obtained was then discharged from the reactor and quenched in a water bath.

The polyamide obtained had an inherent viscosity (IV) of 0.85 dl/g; inherent viscosity was measured on a 0.5 g/L solution in m-cresol at 25° C. The polymer had a melting point of 171° C., as measured by differential scanning calorimetry (DSC).

The following physical properties were also measured to characterize the polymer:

TABLE VII

| | |
|---|---|
| Acid Ends | 101 meq/Kg |
| Amine Ends | 20 meq/Kg |
| Snake Flow | >104 cm |
| Tensile Properties: | |
| Yield Strength (MPa) | 29.1 |
| Break Strength (MPa) | 43.0 |
| Elongation (%) | 388 |
| Flexural Modulus (MPa) | 655 |

NOTE:
Acid ends were measured by dissolving polymer in hot benzyl alcohol and titrating with KOH (0.037N) in benzyl alcohol.
Amine ends were measured by dissolving polymer in phenol/methanol (90/10) and titrating with perchloric acid (0.025N) in methanol.
Snake flow was measured by injection moulding at a temperature of 290° C. and a injection pressure of 15 MPa using a mould having a thickness of 1.0 mm and an elongated snake-like configuration.

This example illustrates the manufacture of a polyamide from an aliphatic diamine and aliphatic acid, each of which contains more than 6 carbon atoms.

EXAMPLE X

This example relates to the blow moulding of a polyamide formed from adipic acid, hexamethylene diamine and 2-methyl pentamethylene diamine.

The following compositions were prepared, using a polyamide containing about 65 mole % hexamethylene adipamide units and 35 mole % 2-methyl pentamethylene adipamide units, the percentages being by weight:

(a) 75.45% polyamide, 10% modified ethylene/propylene/diene (EPDM) elastomer with grafted acid functionality, 7% unmodified EPDM elastomer, 1.4% of a concentrate containing 10% by wt. sodium hypophosphite in polyethylene, 1% polyglycol diepoxide (DER 732 from Dow Chemicals), 4.4% of a carbon black concentrate containing 45% by weight of carbon black in ethylene-methacrylic acid copolymer carrier, 0.25% heat stabilizing additives containing cuprous and potassium iodides; and (b) 75.45% polyamide, 17.5% modified low density polyethylene containing about 1% grafted maleic anhydride, 1.4% of a concentrate containing 10% by weight sodium hypophosphite in polyethylene, 1% polyglycol diepoxide (DER 732 from Dow Chemicals), 4.4% of a carbon black concentrate containing 45% by weight of carbon black in ethylene-methacrylic acid copolymer carrier, 0.25% heat stabilizing additives containing cuprous and potassium iodides.

In addition, compositions (c) and (d) were also prepared; these compositions were similar to the above compositions (a) and (b) respectively, except that the polyamide was replaced by a polyamide containing 95 mole % hexamethylene adipamide units and 5 mole % 2-methyl pentamethylene adipamide units.

The above compositions were prepared on a Werner & Pfleiderer twin screw compounding extruder with barrel temperatures ranging from 240° C. to 250° C. for compositions (a) and (b) and barrel temperatures ranging from 270° C. to 280° C. for compositions (c) and (d). The compositions were pelletized and dried in a desiccating dryer at about 75° C. for 4–8 hours in preparation for blow moulding.

The compositions were blow moulded using a Hartig extrusion blow moulding machine with a 1.4 kg accumulator head. The mould used for this purpose had a cavity in the form of a rectangular hollow plaque with outside dimensions of about 46 cm×10 cm×5 cm. On one side of the plaque were provided two square-shaped draw pockets protruding outward from the plaque by about 1.3 cm and having sides of about 1.9 cm and 3.8 cm, respectively. In addition, one edge of the plaque had a 3-step construction, each step being about 0.95 cm wide and 0.95 cm in depth. Compositions (a) and (b) were blow moulded with a melt temperature of about 235° C. and compositions (c) and (d) were blow moulded with a melt temperature of about 265° C.

Plaques were successfully obtained using all four of the compositions.

EXAMPLE XI

A composition was prepared using a polyamide containing about 65 mole % hexamethylene adipamide units and 35 mole % 2-methyl-pentamethylene adipamide units. The polyamide had a melting point of about 225° C. The composition was prepared in a twin screw extruder by feeding the polyamide along with 1%, by weight of the polyamide of a polyglycol diepoxide (D.E.R. 732 available from Dow Chemicals) in the liquid form and 0.15%, by weight of the polyamide, of sodium hypophosphite in the form of a concentrate consisting of 10 % of sodium hypophosphite in a low density polyethylene carrier (Sclair® 8107 available from Du Pont Canada Inc.) to the main hopper of the extruder. The composition was extruded and pelletized. Melt viscosity of the composition was measured at 240° C. using a Kayness Capillary Viscometer having a die with an orifice of L/D=20. The shear rate-viscosity data is presented in Table VII and compared with that for the unmodified polyamide used in the composition.

The results illustrate a dramatic increase in viscosity achieved for the composition disclosed herein over that of the unmodified polyamide.

EXAMPLE XII

The procedure of Example XI was repeated. However, for this example, 10.7% of an acid-modified ethylene-propylene-diene elastomer and 7.55% of an unmodified ethylene-propylene-diene elastomer, by weight of the total weight of the composition, were also incorporated into the composition. The composition was extruded and pelletized, and the viscosity measurements were carried out using the procedure described in Example XI.

The results of melt viscosity at different shear rates are presented in Table VII, and compared with the corresponding results for the unmodified polyamide used in the formulation.

TABLE VII

| Shear rate (1/s) Melt Viscosity (Pa · s) | 10.41 | 31.25 | 100 | 298 | 1000 |
|---|---|---|---|---|---|
| (a) unmodified polyamide composition | | | | | |
| (b) modified polyamide composition | 149 | 159 | 156 | 143 | 117 |
| Example XI | 1136 | 990 | 705 | 461 | 262 |
| Example XII | 2698 | 1856 | 1143 | 677 | 357 |

Note: The moisture contents of the polyamides were as follows: Unmodified polyamide = 0.017%; modified polyamide of Example XI = 0.041%; and modified polyamide of Example XII = 0.032%.

The results show a dramatic increase in the viscosity of the modified polyamide composition over that of the unmodified polyamide composition.

EXAMPLE XIII

12 L reaction vessel equipped with a helical ribbon agitator and a thermowell for measurement of reaction temperature was charged with 2894 g (12.583 moles) of dodecanedioic acid, 1141 g of hexamethylene diamine in water (78.95%; 7.767 moles), 601 g (5.181 moles) of 2-methyl pentamethylene diamine, 6 mL of 10% (weight basis) Carbowax® 3350 polyethylene glycol in water and 1500 g of demineralized water. With the agitator rotating at 50 rpm, the mixture was heated to 214° C. Subsequently, with the reaction pressure being maintained at 1.72 MPa, volatile matter was released over a period of 74 minutes, during which time the temperature of the reaction mixture rose to 225° C. The pressure in the reactor was then reduced to atmospheric pressure over a period of 83 minutes, the temperature in the reactor rising to 235° C.; the rate of agitation was then reduced to 5 rpm. The reaction mixture obtained was maintained under a vacuum of 40 kPa for 15 minutes, and the polymer obtained was then discharged from the reactor and quenched in a water bath.

The polyamide obtained had an inherent viscosity of 0.61 dL/g, as measured on a 0.5 g/L solution in m-cresol at 25° C. The polymer had a melting point of 188° C., as measured by DSC. The polymer had Amine ends of 270 meq/Kg polymer and Acid ends of 35 meq/Kg polymer; Amine ends and Acid ends were measured as described in Example XII.

This example shows the preparation of a polyamide of dodecanedioic acid, hexamethylene diamine and 2-methyl pentamethylene diamine.

EXAMPLE XIV

A small-scale reaction vessel (autoclave) equipped with a helical ribbon agitator and a thermowell for measurement of reaction temperature was charged with 37.5 g of dodecanedioic acid, 19.1 g of 2-methyl pentamethylene diamine and 35 g of demineralized water. With the agitator rotating at 600 rpm, the mixture was heated to 215° C., and held at that temperature for one hour. The reaction temperature was then increased to 250° C. over a period of 25 minutes, and then to 274° C. with the pressure reduced to atmospheric; the temperature was held for 45 minutes after which the polymer was cooled and removed from the autoclave.

The homopolyamide obtained had a relative viscosity (measured according to Jennings, U.S. Pat. No. 4,702,875) of 30.5, and was white and reasonably hard. The polymer had Amine ends of 31.0 and Acid ends of 101.3. The initial DSC scan showed a small endotherm at 90° C. and a melting point of 153° C.; rapid cooling of molten polymer produced a polymer with crystallization endotherms at 83° and 106° C. and a melting curve at 146° C.

This example shows the preparation of a homopolymer of dodecanedioic acid and 2-methyl pentamethylene diamine.

EXAMPLE XV

A small-scale reaction vessel (autoclave) equipped with a helical ribbon agitator and a thermowell for measurement of reaction temperature was charged with 32.0 g of adipic acid, 25.7 g of 2-methyl pentamethylene diamine and 40 g of demineralized water. With the agitator rotating at 600 rpm, the mixture was heated to 250° C., and held at that temperature for one hour. The pressure was then reduced to atmospheric pressure, and the reaction temperature was increased to 277° C. over a period of 60 minutes; the polymer was cooled and removed from the autoclave.

The homopolyamide obtained had a relative viscosity (measured according to Jennings, U.S. Pat. No. 4,702,875) of 30.9, Amine ends of 45.7 and Acid ends of 82.0. The initial DSC scan showed a crystallization endotherm at 45° C. and a melting point of 184° C.

This example shows the preparation of a homopolymer of adipic acid and 2-methyl pentamethylene diamine.

EXAMPLE XVI

To determine the solubility of the polymers in methanol, 20 g of the homopolymer of 2-methyl pentamethylene diamine and dodecanedioic acid was refluxed (65° C.) with 380 g of methanol for a period of time. Most of the polymer dissolved, but there was a portion of the polymer that did not dissolve. Thus, it was concluded that the solubility of this polymer in methanol is less than 5% by weight of the total solution.

The procedure was repeated using 5 g of the homopolymer of 2-methyl pentamethylene diamine and adipic acid and 10 g of methanol. This polymer completely dissolved in the methanol, and thus the solubility is at least 33% by weight of the total solution. Similarly, it was found that 5 g of a copolymer formed from 2-methyl pentamethylene diamine (70%) and hexamethylene diamine (30%) with adipic acid almost completely dissolved in 10 g of methanol.

EXAMPLE XVII

The procedure of Example XVI was repeated using the polymer of Example XIII, except that the polymer was stirred in methanol at a temperature of 60° C.

It was found that the solubility of the polymer in methanol was less than 1% by weight of the total solution.

EXAMPLE XVIII

Using procedures described above, a homopolymer of 2-methyl-pentamethylene diamine and 1,12-dodecanedioic acid was prepared.

The physical properties of the polymer were measured at 23° C. on dry-as-moulded (DAM) samples, using the procedures described herein. As a comparison, physical properties were also measured on a homopolymer of hexamethylene diamine and 1,12-dodecanedioic acid (nylon 6,12) and on a homopolymer of 1,12-dodecamethylene diamine and 1,12-dodecanedioic acid (nylon 12,12). The results obtained were as follows:

TABLE VIII

| Run No. | 24 | 23 | 24 |
|---|---|---|---|
| Polymer | A | B | C |
| Melting Point (degrees C.) | 143/160 | 216 | 182 |
| Heat of Fusion (J/g) | 33 | 52 | 62 |
| Tensile Properties | | | |
| Yield Strength (MPa) | 30.0 | 58.6 | 36.5 |
| Maximum Strength (MPa) | 65.8 | 58.6 | 59.6 |
| Ultimate Elongation (%) | 430 | 86 | 360 |
| Flexural Modulus (MPa) | 675 | 2125 | 1150 |
| Notched Izod Impact Strength (J/m) | 16 | 27 | 160 |
| Glass Transition Temperature (¾ C.) | 28 | 45 | 41 |

Note:
Polymer A was homopolymer of 2-methyl-pentamethylene diamine and 1,12-dodecanedioic acid
Polymer B was homopolymer of hexamethylene diamine and 1,12-dodecanedioic acid
Polymer C was homopolymer of 1,12-dodecamethylene diamine and 1,12-dodecanedioic acid This example illustrates difference in the properties of the three homopolymers.

We claim:

1. A mouldable reinforced polyamide composition comprising:
   (a) a polyamide consisting of 2-methyl-pentamethylene diamine polymerized with an aliphatic dicarboxylic acid having 12 carbon atoms, the polyamide having formic acid RV greater than about 20 and a solubility in methanol at 65° C. of less than 5% by weight; and
   (b) a filler in an amount of 0.5 to 100 parts by weight of said polyamide.

2. The composition of claim 1 or claim 2 in which the RV of the polyamide is between about 25 and 250.

3. The composition of claim 3 in which the RV is between about 30 and 80.

4. The composition of claim 1 which additionally contains a diepoxide cross-linking agent.

5. The composition of claim 1 in which the amount of filler is 2 to 100 parts by weight.

6. A polyamide consisting of 2-methyl-pentamethylene diamine polymerized with 1,12-dodeanediodic acid, the polyamide having a formic acid RV is greater than about 20 and a solubility in methanol at 65° C. of less than 5% by weight.

7. The polyamide of claim 6 in which the RV of the polyamide is between about 25 and 250.

8. The polyamide of claim 7 in which the RV is between 30 and 80.

9. A polyamide consisting essentially of 2-methyl-pentamethylene diamine polymerized with 1,12-dodecanediodic acid, the polyamide having an RV greater than about 20 and a solubility in methanol at 65° C. of less than 5% by weight which additionally contains a diepoxide cross-linking agent.

10. An article formed from a polyamide consisting of 2-methyl-pentamethylene diamine polymerized with 1,12-dodecanedioic acid, the polyamide having a formic acid RV greater than about 20 and a solubility in methanol at 65° C. of less than 5% by weight, said article being film, wire coating, pipe, tubing, thermoformed article, moulded article or powder coating.

11. An article formed from a polyamide consisting essentially of 2-methyl-pentamethylene diamine polymerized with at least one aliphatic dicarboxylic acid having 6–12 carbon atoms, the polyamide having an RV greater than about 20 said article being a film, wire coating, pipe, tubing, thermoformed article, rotomoudled article, molded article or powder coating in which the polyamide additionally contains a diepoxide cross-linking agent.

* * * * *